UNITED STATES PATENT OFFICE.

ADOLPH SOMMER, OF BERKELEY, CALIFORNIA.

SOLUTION OF BENZOIC SULPHIONIDE IN OILS, &c.

SPECIFICATION forming part of Letters Patent No. 410,940, dated September 10, 1889.

Application filed April 24, 1886. Serial No. 200,090. (No specimens.)

*To all whom it may concern:*

Be it known that I, ADOLPH SOMMER, a citizen of the United States, residing at Berkeey, in the county of Alameda and State of California, have invented new and useful Mixtures of Benzoic Sulphionide, with a certain class of ingestible carbon compounds; and I do hereby declare that the following is a full, clear, and exact description of the invention, which will enable others skilled in chemical manipulations to apply and make the same.

Heretofore the use of benzoic sulphionide as a sweetening agent has been confined to such of the alimentary and medicinal substances as are soluble in water, while the sweetening of any of those alimentary, medicinal, and chewable carbon compounds which are insoluble in water, but soluble in bisulphide of carbon, has been accomplished only by the mechanical incorporation of either sugar, glycerine, or extract of licorice. I find, however, that this latter class of substances is capable, under certain conditions, of dissolving a small amount of benzoic sulphionide, and that the sweetening of these bodies can be accomplished much better than has been done heretofore by treating them in the manner described below.

In order to prepare these compositions, I reduce the carbon compound, or a mixture of such compounds, if the same is not liquid at the prevailing temperature, by the aid of heat, or by means of a solvent, or both, to the liquid or plastic state. I then add of finely-powdered benzoic sulphionide an amount sufficient to impart the desired degree of sweetness and thoroughly incorporate the powder by agitation. I continue the agitation, aided, if necessary, by heating, until the benzoic sulphionide is entirely or nearly dissolved. If the finished composition is to be transparent, I filter the mixture by any of the well-known devices suitable to the occasion. In the case of substances which are ordinarily liquid and which would be deteriorated by heating—such as cod-liver oil and copaiba—I omit the heating altogether and bring about the combination by prolonged digestion at the prevailing temperature and frequent agitation. The combination of benzoic sulphionide with this class of bodies may also be effected by dissolving the benzoic sulphionide in any of its recognized good solvents—such as alcohol and ether—adding this solution to the substance to be sweetened, and heating the mixture with constant agitation until the original solvent has evaporated. Still another way of accomplishing the same result, which, however, is only applicable to those substances which are either liquid or readily liquefied, is to filter the liquid or liquefied substance that is to be sweetened through a layer of benzoic sulphionide, which, in order to make the layer more porous, I mix previously with some loose inert material. Instead of using pure benzoic sulphionide, the commercial article, sold under the name of "saccharine," which consists, mainly, of benzoic sulphionide, may be employed; but as a considerable portion of this article is insoluble in the class of compounds cited it can only be employed in those cases where the finished product need not be transparent or where it is possible to filter the mixture. The quantity of benzoic sulphionide which I combine with any of these substances depends upon the purpose for which the mixture is to be used; but I find that when the composition is to be eaten the proportion of about three parts of benzoic sulphionide to one thousand parts of the edible substance is generally sufficient, while for compositions which are to be masticated only a larger proportion, averaging one part of benzoic sulphionide to one hundred parts of the chewable substance, is necessary. I do not, however, restrict myself to any of these proportions, but alter them to suit the requirements of the occasion.

In order to better show the bearing of my invention, I will explain the meaning of the term "ingestible carbon compounds" as used and understood in this specification, and also enumerate those special substances which come within the scope of the limitation "insoluble in water, but soluble in bisulphide of carbon."

The term "ingestible carbon compounds" comprises all of those carbonaceous substances which are intended to be taken into the mouth, thus including the majority of comestibles, internal medicinal remedies, and of substances to be simply chewed or masticated. The qualification "insoluble in water, but soluble in bisulphide of carbon," however, restricts these substances to certain distinct groups—namely, to the oils, fats, waxes, resinous bodies, and paraffines, excluding thereby all saccharine, farinaceous, and albuminous bodies, as well as most of the medicinal substances.

The oils and fats comprise certain liquid and solid animal and vegetable products, which are insoluble in water, but dissolved by bisulphide of carbon, and are composed mainly of the glycerides of certain organic acids. The principal oils and fats to which I have reference are, olive-oil, almond-oil, ground-nut oil, cotton-seed oil, sesame-oil, poppy-seed oil, sunflower-oil, colza-oil, mustard-seed oil, niger-seed oil, castor-oil, lard, tallow, butter, oleomargarine, and cod-liver oil.

The waxes comprise certain solid substances originating from plants or insects, which are insoluble in water, but dissolved by bisulphide of carbon, and consist, mainly, of various organic acids, both free and in combination with alcohol radicals, other than glycerine. The principal waxes to which I have reference are beeswax, carnauba-wax, china-wax, and japan-wax.

The resinous bodies comprise certain liquid and solid substances of vegetable origin, which are insoluble in water, but dissolved by bisulphide of carbon, and consist, mainly, of various organic acids and hydrocarbons. They are technically divided into several sub-groups, of which the soft resins, oleoresins, and india-rubber-like substances alone are of import in connection with this invention. The principal resinous bodies to which I have reference are rosin, spruce-gum, copaiba, balata, chicle, gutta-percha, and india-rubber.

The paraffines comprise certain solid and semi-solid substances which are insoluble in water, but dissolved by bisulphide of carbon, and consist of one or more of the higher members of a homologous series of compounds that is known as the "paraffine series of hydrocarbons." The principal paraffines to which I have reference are paraffine, mineral wax, and vaseline.

Having thus described my invention, what I claim, and desire to secure by Letters Patent, is—

As a new composition, the solution of benzoic sulphionide, in that class of ingestible carbon compounds which is insoluble in water, but soluble in bisulphide of carbon.

ADOLPH SOMMER.

Witnesses:
GRANT W. JOY,
PATRICK J. HEALY.

Corrections in Letters Patent No. 410,940.

It is hereby certified that in Letters Patent No. 410,940, granted September 10, 1889, upon the application of Adolph Sommer, of Berkeley, California, for an improvement in "Solutions of Benzoic Sulphinide in Oils, &c.," errors appear in the grant and in the printed specification, by the improper use of the word "sulphionide" for *sulphinide*, requiring the following correction, viz: That wherever said word "sulphionide" appears throughout the grant and specification said word should read *sulphinide;* and that the Letters Patent should be read with these corrections therein that the same may conform to the record of the case in the Patent Office.

Signed, countersigned, and sealed this 1st day of October, A. D. 1889.

[SEAL.]

CYRUS BUSSEY,
*Assistant Secretary of the Interior.*

Countersigned:

C. E. MITCHELL,
*Commissioner of Patents.*